UNITED STATES PATENT OFFICE.

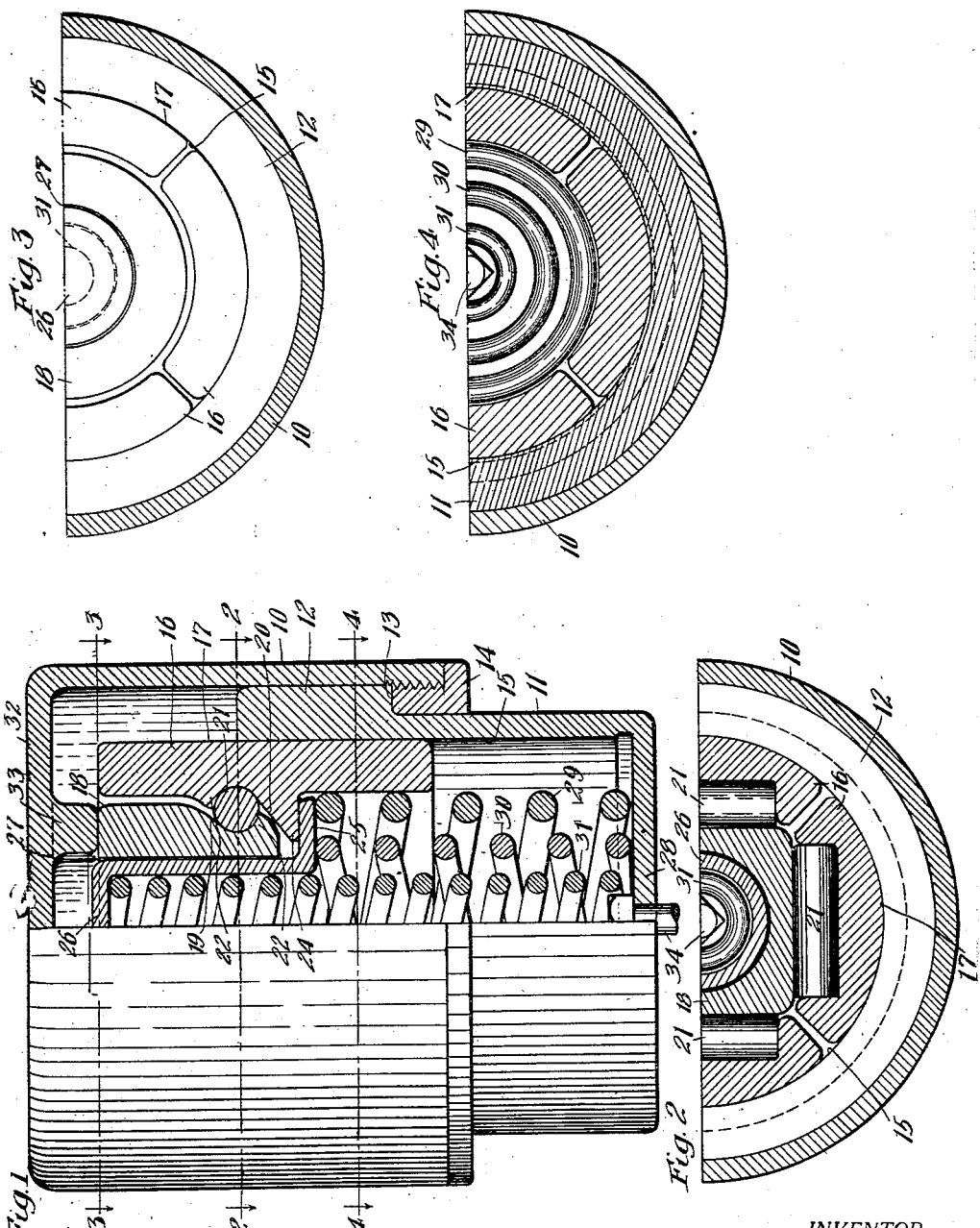

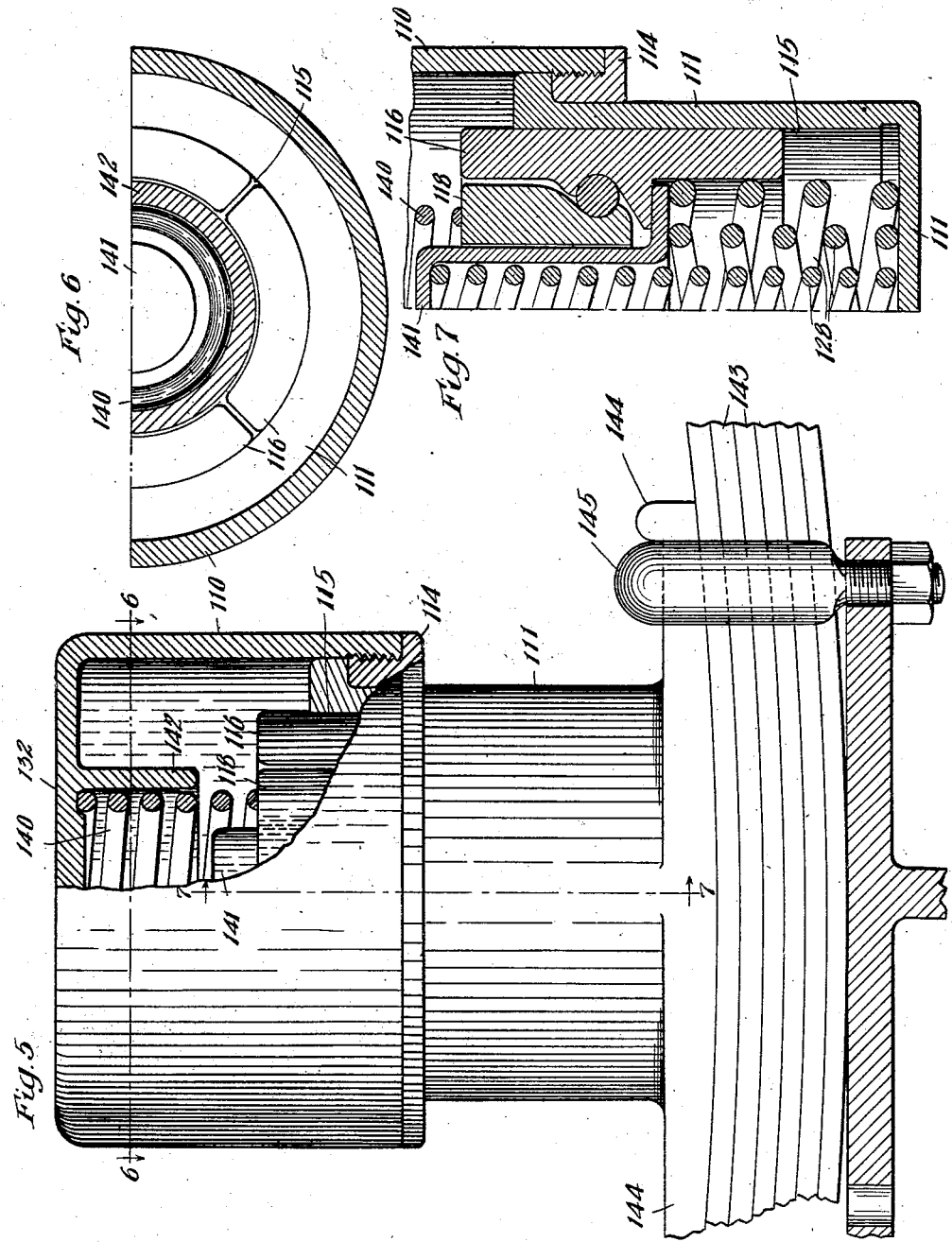

JOHN F. O'CONNOR, OF CHICAGO, ILLINOIS, ASSIGNOR TO WILLIAM H. MINER, OF CHICAGO, ILLINOIS.

SHOCK-ABSORBER.

1,135,607.   Specification of Letters Patent.   Patented Apr. 13, 1915.

Application filed January 21, 1914.   Serial No. 813,355.

*To all whom it may concern:*

Be it known that I, JOHN F. O'CONNOR, a citizen of the United States, residing in Chicago, in the county of Cook and State of Illinois, have invented a new and useful Improvement in Shock-Absorbers, of which the following is a specification.

This invention relates to improvements in shock absorbers.

The object of the invention is to provide a shock absorber which is particularly adapted for use in connection with vehicles and more especially automobiles, the cushion being so designed that it provides a graduated, combined spring and frictional action.

The invention furthermore consists in the improvements in the parts and devices and in the novel combinations of the parts and devices herein shown, described or claimed.

In the drawing forming a part of this specification, Figure 1 is a half side elevation, half vertical section of a shock absorber embodying my improvements. Figs. 2, 3 and 4 are half horizontal sectional views taken, respectively, on the lines 2—2, 3—3 and 4—4 of Fig. 1. Fig. 5 is a side elevation of another form of shock absorber embodying my improvements, parts being broken away to more clearly illustrate the construction. Fig. 6 is a half horizontal sectional view taken on the line 6—6 of Fig. 5, and Fig. 7 is a vertical section taken on the line 7—7 of Fig. 5.

Referring now more particularly to the structure shown in Figs. 1 to 4, inclusive, 10 denotes a cylindrical casing and 11 another cylindrical casing telescoped therewithin. The casing 11, at its upper end, is provided with an enlarged section 12 forming an annular shoulder 13 with which coöperates the inner end of a bushing 14 threaded into the casing 10, the bushing preventing the two casings from becoming separated. The casing 11 is provided with an internal cylindrical friction surface 15, thus forming what is commonly termed a "friction shell," with which coöperate a plurality of circularly arranged, segmental friction shoes 16, four of such shoes being shown in the drawing. Each of the shoes 16 has an outer friction surface 17 which slides upon and coöperates with the surface of the friction shell. A spreader or wedge 18, substantially rectangular in cross section, is interposed between the friction shoes, said wedge having a plurality of inclined surfaces 19 corresponding in number to the number of friction shoes, said inclined surfaces 19 being disposed opposite coöperating similarly inclined surfaces 20 on each of the friction shoes, and interposed between each pair of inclined surfaces 19 and 20 is an antifriction roller 21. The rollers 21 are retained in proper position when all the parts are at normal by retaining shoulders 22, 22 formed on the wedge and shoes, see Fig. 1. Each of the friction shoes, on its inner side, is provided with a shoulder 24 which is engaged by an outwardly turned flange 25 on the lower end of a cylindrical spring cap 26 which extends up through a corresponding recess 27 in the wedge 18. A plurality of nested springs are interposed between the spring cap 26 and the bottom 28 of the lower casing 11, there being two springs 29 and 30 which engage the flange 25 and a longer spring 31 which extends up into the spring cap 26 and engages the top wall thereof. The top wall 32 of the upper casing 10 is provided on its inner side with a rib 33 in alinement with the wedge 18 and in engagement therewith. As will be understood, the shock absorber is secured to the spring of the automobile directly over the axle and beneath a part of the frame or chassis or a plate secured thereto and may be held in position by any suitable means such as the bolt 34, see Fig. 1.

From the preceding description, it will be seen that the shock absorber which I have provided will absorb or cushion the shocks created by sudden jolting of the automobile or other vehicle to which it is attached, the shocks being absorbed gradually and progressively as the two spring casings are telescoped more and more, due to the spreader or wedge gradually increasing the pressure between the friction shoes and the friction shell. The antifriction rollers interposed between the wedge and the shoes are provided to insure a certain release of the parts when the parts return to normal.

Referring now to the structure shown in Figs. 5 to 7, inclusive, 110 and 111 denote the two spring casings which correspond respectively to the casings 10 and 11 shown in Figs. 1 to 4, the casings 110 and 111 being held in telescoped relation by means of a threaded bushing 114. The casing 111 is provided with a friction surface 115 with which coöperate a plurality of circularly arranged, segmental friction shoes 116, the latter having interposed therebetween a wedge or spreader 118. A plurality of springs 128 are interposed between the shoes and the lower end of the casing 111 which operate to resist longitudinal movement of the friction shoes and increase the frictional action in a similar manner to that which occurs in the structure shown in Figs. 1 to 4. Interposed between the wedge 118 and the upper wall 132 of the casing 110 is a preliminary compression spring 140 which engages the upper surface of the wedge 118 and is seated over a cap 141 mounted therein. Formed integrally with the casing 110, on the inner side of the upper wall thereof, is an annular rib 142 which forms a pocket for the spring 140 and which is also adapted to engage the upper surface of the wedge 118 when the spring 140 has been compressed. As shown more clearly in Fig. 5, the spring cushion may be attached to the elliptical spring 143 of an automobile or other vehicle by means of laterally extending flanges 144 cast integrally with the casing 111, the parts being held in place by clips or bands 145 encircling the flanges 144 and spring 143.

With the arrangement shown in Figs. 5 to 7, it will be noted that a preliminary spring action only is obtained during the first part of the relative movement between the telescoped casings, it being understood that the springs 128 are strong enough to resist movement of the friction shoes and wedge until after the spring 140 has been compressed and the fang 142 engages the wedge. After the spring 14 is compressed, the wedge then presses the friction shoes outwardly against the friction shell and moves the same therealong, thus providing additional and greater automatically increased resistance to the telescoping action of the casings. By comparison of the two forms it will be noted that with the structures shown in Figs. 1 to 4, longer main springs may be employed than in the other arrangement.

Although I have herein shown and described what I now consider the preferred embodiment of my improvements, yet it will be understood that various changes and modifications may be made without departing from the spirit of the invention, and all such changes and modifications are contemplated as come within the scope of the claims appended hereto.

I claim:

1. A shock absorber comprising, in combination, two casings, one of said casings having a friction shell movable therewith, a wedge and friction shoes coöperable with said shell, a main spring located within said casing with the friction shell, and a preliminary spring interposed between the other shell and said friction elements whereby to provide an easy initial movement.

2. A shock absorber, comprising two telescoped casings, one of said casings having an integral internal friction shell, friction shoes and a spreader therefor coöperable with said shell, main springs within said casing having the friction shell and arranged to resist movement of the friction shoes, and a preliminary compression spring interposed between the other casing and the friction elements, said spreader being normally out of engagement with the last named casing and adapted to be operated by the latter after the preliminary compression spring has been compressed.

3. A shock absorber comprising two casings, one of which is provided with an internal friction shell, friction shoes coöperable with said shell, each of said shoes having an inwardly extending shoulder, a hollow spreader coöperable with said shoes, a spring cap disposed within said spreader and having a flange engaging said shoulders and springs normally resisting movement of said friction shoes, one of said springs extending within said spring cap.

Signed this 16th day of January, 1914, in the presence of two witnesses.

JOHN F. O'CONNOR.

Witnesses:
WILLIAM A. GEIGER,
JOSEPH HARRIS.